United States Patent
Lam et al.

(10) Patent No.: US 12,023,809 B2
(45) Date of Patent: Jul. 2, 2024

(54) SELF-RECONFIGURABLE ROBOT MODULE AND SELF-RECONFIGURABLE ROBOT

(71) Applicants: SHENZHEN INSTITUTE OF ARTIFICIAL INTELLIGENCE AND ROBOTICS FOR SOCIETY, Shenzhen (CN); THE CHINESE UNIVERSITY OF HONG KONG, SHENZHEN, Shenzhen (CN)

(72) Inventors: Tin Lun Lam, Shenzhen (CN); Guanqi Liang, Shenzhen (CN)

(73) Assignees: SHENZHEN INSTITUTE OF ARTIFICIAL INTELLIGENCE AND ROBOTICS FOR SOCIETY, Shenzhen (CN); THE CHINESE UNIVERSITY OF HONG KONG, SHENZHEN, Shenzhen (CN)

( * ) Notice: Subject to any disclaimer, the term of this patent is extended or adjusted under 35 U.S.C. 154(b) by 770 days.

(21) Appl. No.: 17/134,066

(22) Filed: Dec. 24, 2020

(65) Prior Publication Data
US 2021/0205983 A1    Jul. 8, 2021

(30) Foreign Application Priority Data

Jan. 3, 2020   (CN) .......................... 202010009327.0

(51) Int. Cl.
B25J 9/16    (2006.01)
(52) U.S. Cl.
CPC .................................. B25J 9/1617 (2013.01)
(58) Field of Classification Search
CPC ......... B25J 9/1617; B60L 13/04; B60L 13/10; B60B 19/003; B60B 19/006
See application file for complete search history.

(56) References Cited

U.S. PATENT DOCUMENTS

| | | | | |
|---|---|---|---|---|
| 3,746,117 A | * | 7/1973 | Alred ..................... | B62D 57/04 180/7.3 |
| 3,798,835 A | * | 3/1974 | McKeehan .......... | A63H 33/005 446/442 |

(Continued)

FOREIGN PATENT DOCUMENTS

CN    206719346 U    12/2017

*Primary Examiner* — Kevin Hurley
*Assistant Examiner* — Michael R Stabley
(74) *Attorney, Agent, or Firm* — ANOVA LAW GROUP, PLLC

(57) ABSTRACT

A self-reconfigurable robot module and self-reconfigurable robot is provided, which belongs to technical field of robots. Self-reconfigurable robot module comprises rolling shell, magnet and driving mechanism. Magnet locates in and magnetically connected with rolling shell. Driving mechanism locates in rolling shell, magnet connects to driving mechanism, driving mechanism abuts against inner wall of rolling shell through attraction force, used for driving magnet to move along inner wall of rolling shell and changing gravity center of self-reconfigurable robot module. When driving mechanism drives magnet to move along inner wall of rolling shell, position of magnet relative to rolling shell is changed, so positions of connecting points, used for being connected with other self-reconfigurable robot modules, on rolling shell are changed, multiple positions on surface of rolling shell can serve as connecting points, self-reconfigurable robot modules are connected without aligning specific connectors, connecting time is short, efficiency is high.

12 Claims, 8 Drawing Sheets

(56) References Cited

U.S. PATENT DOCUMENTS

| | | | | |
|---|---|---|---|---|
| 4,501,569 A | * | 2/1985 | Clark, Jr. | A63H 33/005 |
| | | | | 180/21 |
| 4,726,800 A | * | 2/1988 | Kobayashi | A63H 33/005 |
| | | | | 446/458 |
| 5,533,921 A | * | 7/1996 | Wilkinson | A63H 30/04 |
| | | | | 446/458 |
| 6,227,933 B1 | * | 5/2001 | Michaud | A63H 33/005 |
| | | | | 446/458 |
| 7,891,445 B1 | * | 2/2011 | McKinley | B60B 19/14 |
| | | | | 180/7.1 |
| 8,099,189 B2 | * | 1/2012 | Kaznov | A63H 17/00 |
| | | | | 700/47 |
| 8,670,889 B2 | * | 3/2014 | Kaznov | B25J 5/00 |
| | | | | 701/23 |
| 9,090,214 B2 | * | 7/2015 | Bernstein | A63H 27/12 |
| 9,211,920 B1 | * | 12/2015 | Bernstein | B62D 39/00 |
| 10,308,134 B2 | * | 6/2019 | Fontaine | C08G 77/26 |
| 2006/0243497 A1 | * | 11/2006 | Orenbuch | B60B 19/12 |
| | | | | 180/6.2 |
| 2017/0239982 A1 | * | 8/2017 | Fontaine | B60C 11/00 |

* cited by examiner

SELF-RECONFIGURABLE ROBOT MODULE AND SELF-RECONFIGURABLE ROBOT

CROSS-REFERENCE TO RELATED APPLICATION

This application claims the priority of Chinese patent application No. 202010009327.0, filed on Jan. 3, 2020, the entire contents of all of which are incorporated herein by reference.

FIELD OF THE APPLICATION

The present application relates to the field of robot and, more particularly, to a self-reconfigurable robot module and a self-reconfigurable robot.

BACKGROUND

A modular self-reconfigurable robot (MSRR) is a research hotspot in academia in recent years. The modular self-reconfigurable robot is composed of a plurality of robot modules, the modules may be rearranged according to a task requirement, making a system take a plurality of different shapes. In the present technology, the robot modules are mostly composed of a plurality of cubes, and a connection between the modules occurs on a surface of the cube. The robot modules are traditionally often configured with one or a plurality of connectors, and during a process of connecting with a plurality of other robot modules, a trajectory planning is required to align the connectors correctly, having a connection efficiency low. Moreover, the connectors and the cube shaped robot modules have restrained the robot modules from forming other configurations.

BRIEF SUMMARY OF THE DISCLOSURE

A plurality of embodiments in the present application provide a self-reconfigurable robot module to solve the problem that, the connection efficiency is low when connecting with other robot modules, and the configuration is restrained due to the cube shaped robot modules.

In order to achieve the above said targets, the technical solution of the present application is as follows:

A first aspect, a plurality of embodiments in the present application provide a self-reconfigurable robot module, comprising: a rolling shell, a magnet and a driving mechanism;

the magnet locates in and magnetically connects with the rolling shell;
the driving mechanism locates in the rolling shell, the magnet connects to the driving mechanism, the driving mechanism abuts against an inner wall of the rolling shell through an attraction force between the magnet and the rolling shell, while the driving mechanism is applied to driving the magnet to move along the inner wall of the rolling shell and changing a gravity center of the self-reconfigurable robot module.

In the technical solution described above, the magnet and the driving mechanism are both locating inside the rolling shell, making a structure of the self-reconfigurable robot module as a whole compact, a volume small and a weight light. The magnet and the rolling shell are magnetically connected, that is, between the magnet and the rolling shell, there is an attraction force generated, to make the driving mechanism abut against the inner wall of the rolling shell. The magnet generates a magnet field around itself, and the magnet is able to be applied to generating an attraction force with the rolling shells of a plurality of other self-reconfigurable robot modules; of course, the rolling shell thereof is also able to generate an attraction with the magnet of the other self-reconfigurable robot modules. When the driving mechanism drives the magnet to move along the inner wall of the rolling shell, a position of the magnet relative to the rolling shell changes, thereby changing a position of a connection point on the rolling shell for connecting with the other self-reconfigurable robot modules, which makes a plurality of positions on a surface of the rolling shell be able to act as a plurality of connection points, and a connection between the self-reconfigurable robot modules requires no aligning between a plurality of specific connectors, having a short connection time and a high efficiency. In addition, since during a process of the driving mechanism driving the magnet to move, a position of a center of gravity of the self-reconfigurable robot module changes, generating a torque and making the self-reconfigurable robot module roll forward, making the self-reconfigurable robot module be able to roll along a plane, and even climb up a vertical wall being able to be absorbed and attached by the magnet, further realize an automatic connection between the self-reconfigurable robot modules.

In addition, the self-reconfigurable robot module provided by the embodiments of the present application further owns an additional technical feature as following:

in some embodiments of the present application, the magnet and the inner wall of the rolling shell are forming a non-contact connection.

In the technical solution described above, the magnet and the inner wall of the rolling shell are forming a non-contact connection, that is, although there is an attraction force between the magnet and the rolling shell, the magnet and the inner wall of the rolling shell are not contacting each other, that makes the magnet be able to move more easily under an action of the driving mechanism.

In some embodiments of the present application, the driving mechanism comprises a base frame, a driving device and at least one driving wheel;

the driving wheel is rotatably arranged on the base frame;
the driving device is applied to driving the driving wheel to rotate relative to the base frame;
the magnet connects to the base frame, and the driving wheel abuts against the inner wall of the rolling shell by the attraction force between the magnet and the rolling shell.

In the technical solution described above, the driving wheel abuts against the inner wall of the rolling shell under the attraction force between the magnet and the rolling shell, and the driving device drives the rolling wheel to rotate to make the magnet be able to move along the inner wall of the rolling shell, thereby changing a position of the magnet. The present driving mechanism has an advantage of a structure simple and compact.

In some embodiments of the present application, the at least one driving wheel refers to comprise two driving wheels arranged oppositely;

the driving device comprises two driving units, and each driving unit is applied to driving a driving wheel accordingly to rotate relative to the base frame.

In the technical solution stated above, driving the two driving wheels independently by the two driving units, it is able to control a rotation of the two driving wheels separately, to realize the rotation of the two driving wheels in a same direction or an opposite direction. When the two driving units are driving the two driving wheels to rotate in the same direction respectively, the magnet may be made move on a circle relative to the rolling shell; when the two driving units are driving the two driving wheels to rotate in the opposite direction respectively, the driving mechanism in a whole may drive the magnet to rotate, to change a direction of the driving mechanism in a whole, making the magnet be able to move on different circles relative to the rolling shell. Under an action of the two driving units, it is able to make the magnet locate at any one position on the rolling shell, that makes any one position on the surface of the rolling shell be able to act as the connection points.

In some embodiments of the present application, the magnet is fixed on a bottom of the base frame, and the magnet locates in a middle of the two driving wheels.

In the technical solution described above, the magnet is fixed on the bottom of the base frame and the magnet locates in the middle of the driving wheels, such a structure makes the driving mechanism in a whole have a good stability. In addition, when the two driving units are driving the two driving wheels to rotate in the opposite direction respectively, the magnet may rotate with a centerline thereof as an axis, ensuring a good stability during the rotation of the magnet.

In some embodiments of the present application, the driving mechanism further comprises at least one guiding wheel rotatably arranged on the base frame and applied to contacting with the inner wall of the rolling shell.

In the technical solution described above, the guiding wheel plays a role of an auxiliary support, to ensure that the driving mechanism is able to maintain a balance during driving the magnet moving.

In some embodiments of the present application, the at least one guiding wheel refers to comprise two guiding wheels;
the two driving wheels are arranged on the base frame at an interval along a left-and-right direction;
the two guiding wheels are arranged on the base frame at an interval along a front-and-rear direction;
a contact position of the guiding wheel and the inner wall of the rolling shell is higher than a contact position of the driving wheel and the inner wall of the rolling shell.

In the technical solution described above, the two driving wheels are arranged on the base frame at an interval in the left-and-right direction, and the two guiding wheels are arranged on the base frame at an interval in the front-and-rear direction, that is, a line of the two driving wheels is perpendicular to a line of the two guiding wheels, and since the contact position between the guiding wheel and the inner wall of the rolling shell is higher than the contact position of the driving wheel and the inner wall of the rolling shell, when the driving mechanism is driving the magnet to move forward along the inner wall of the rolling shell, the guiding wheel on a front side may play a pretty good supporting role, and when the driving mechanism is driving the magnet to move backward along the inner wall of the rolling shell, the guiding wheel located on a rear side may play a pretty good supporting role, that makes the driving mechanism have a good stability during driving the magnet moving. In addition, when the two driving wheels are leaning closely on the rolling shell due to a magnetic force between the magnet and the rolling shell, the friction between the two guiding wheels and the rolling shell may not increase due to a huge attraction force generated by the magnet, that prevents an affection to the driving mechanism driving the magnet moving, due to an excessive friction between the guiding wheel and the rolling shell.

In some embodiments of the present application, the base frame comprises a first frame body and a second frame body;
the driving wheel is rotatably arranged on the first frame body;
the guiding wheel is rotatably arranged on the second frame body;
the first frame body and the second frame body are detachably connected.

In the technical solution described above, the driving wheel is rotatably arranged on the first frame body, the guiding wheel is rotatably arranged on the second frame body, the first frame body and the second frame body are detachably connected, by making the first frame body and the second frame body detachable, it is possible to disassemble the guiding wheel.

In some embodiments of the present application, the rolling shell is a metal hollow sphere.

In the technical solution described above, the rolling shell is a metal hollow sphere, making the rolling shell have a better rolling ability.

In some embodiments of the present application, the driving mechanism and the magnet are both located in a lower hemisphere of the metal hollow sphere.

In the technical solution described above, the driving mechanism and the magnet are both located in the lower hemisphere of the metal hollow sphere, making the center of gravity of the self-reconfigurable robot module in a whole lower, and the self-reconfigurable robot module is easier to roll during a process of the driving mechanism driving the magnet to move.

A second aspect, an embodiment of the present application provides a self-reconfigurable robot, comprising a plurality of the reconfiguration robot modules provided in the first aspect;
every two adjacent self-reconfigurable robot modules are magnetically connected.

In the technical solution described above, between the reconfiguration robot modules in the reconfiguration robot, it is able to realize a multi-point high-efficiency connection, and by a plurality of reconfiguration robot modules, it is possible to form a plurality of reconfiguration robots of a plurality of various forms, so as to adapt to a plurality of various different working environments.

BRIEF DESCRIPTION OF THE DRAWINGS

In order to describe the technical solutions of the embodiments of the present application more clearly, a brief introduction to the drawings needed in the following embodiments is briefly stated herein. It should be understood that the following drawings only show a certain embodiments of the present application, and therefore should not be regarded as a limitation to the scope, for those ordinary skilled in the art, without any creative works, they can further obtain other related drawings based on the present drawings.

Figure 1:
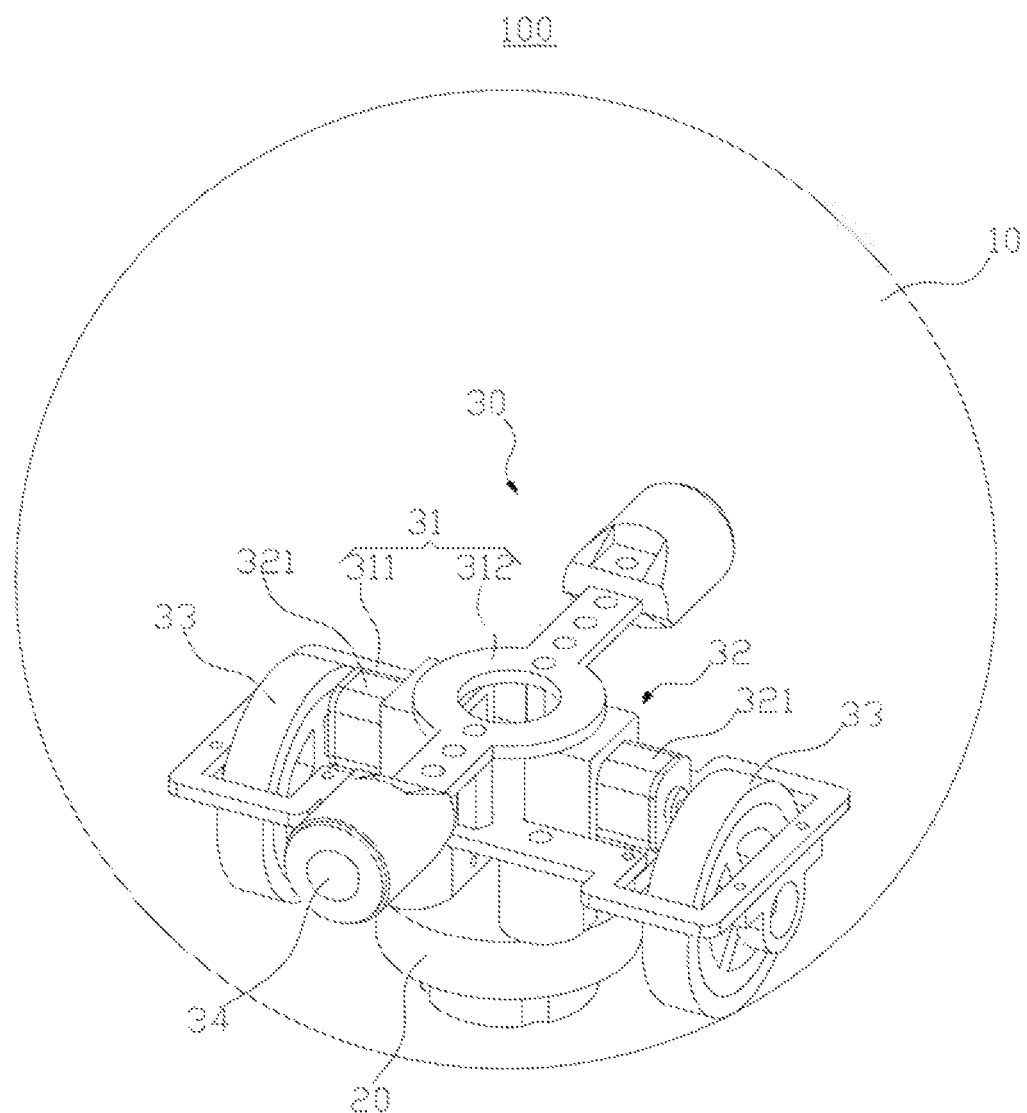
FIG. 1 illustrates a structural schematic diagram of a self-reconfigurable robot module provided in an embodiment of the present application.

Wherein, 100—self-reconfigurable robot module; 101—first self-reconfigurable robot module; 102—second self-reconfigurable robot module; 10—rolling shell; 20—magnet; 30—driving mechanism; 31—base frame; 311—first frame body; 312—second frame body; 3121—connection plate; 3122—hollow cylinder; 3123—supporting column; 32—driving device; 321—driving unit; 33—driving wheel; 34—guiding wheel; 200—self-reconfigurable robot; A—reference plane.

DETAILED DESCRIPTION

In order to make the purpose, technical solution and the advantages of the present application clearer and more explicit, further detailed descriptions of the present application are stated herein, referencing to the attached drawings and some embodiments of the present application. Obviously, the embodiments described herein are a part of the embodiments of the present application, instead of all the embodiments. A plurality of components of the embodiments in the present application generally described and shown in the drawings herein may be arranged and designed in a plurality of various different configurations.

Therefore, a detailed description below provided in the drawings and on the embodiments of the present application is not intended to limit a scope of the application claimed, but merely represents a plurality of selected embodiments of the present application. Based on the embodiments of the present application, other embodiments obtained by those ordinary skilled in the art without any creative work shall all fall within the protection scope of the present application.

It should be noted that similar reference numerals and letters indicate similar items in the following drawings. Therefore, once an item is defined in one drawing, it does not need to be further defined and explained in the subsequent drawings.

In the description of the embodiments of the present application, it should be noted that, an indicated orientation or a positional relationship is based on the orientation or the positional relationship shown in the drawings, or the orientation or the positional relationship that is customarily placed when the product in the application is in use, or the orientation or the positional relationship commonly understood by those skilled in the art, or the orientation or the positional relationship usually placed when the product in the application is in use. It is only for a convenience of describing the application and simplifying the description, instead of indicating or implying that the device or the element referred to must have a specific orientation, or must be constructed and operated in a specific orientation, therefore it cannot be understood as a limitation to the present application. In addition, the terms "first" and "second" are used only to distinguishing the descriptions, instead of being understood as indicating or implying a relative importance.

Embodiments

The present application provides a self-reconfigurable robot module 100, which has an advantage of a multi-point efficient connection. A structure of the self-reconfigurable robot module 100 is described in details below with reference to FIGS. 1 to 8.

Figure 2:
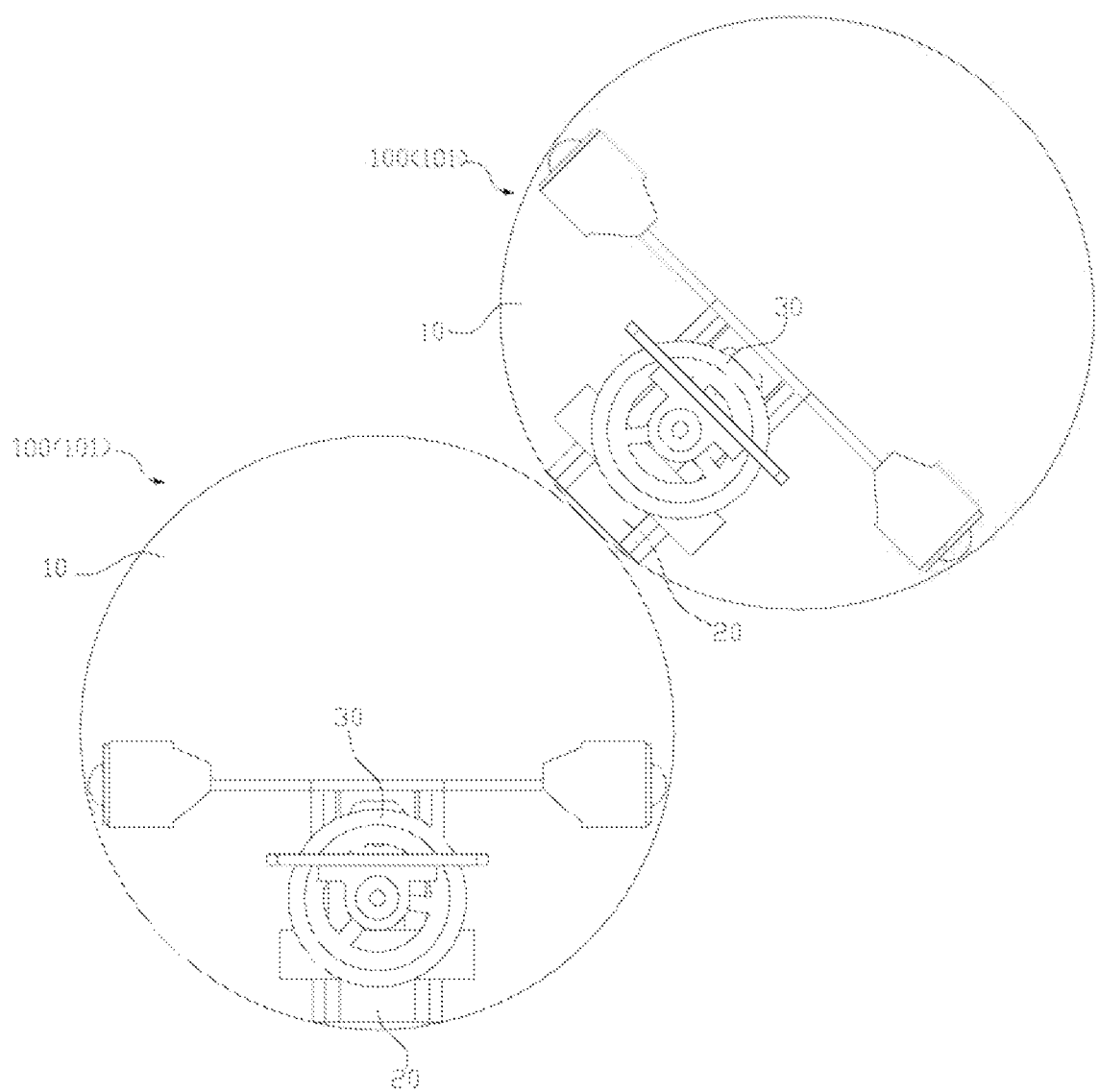
FIG. 2 illustrates a schematic diagram on a connection between two self-reconfigurable robot modules provided in an embodiment of the present application.
Figure 3:
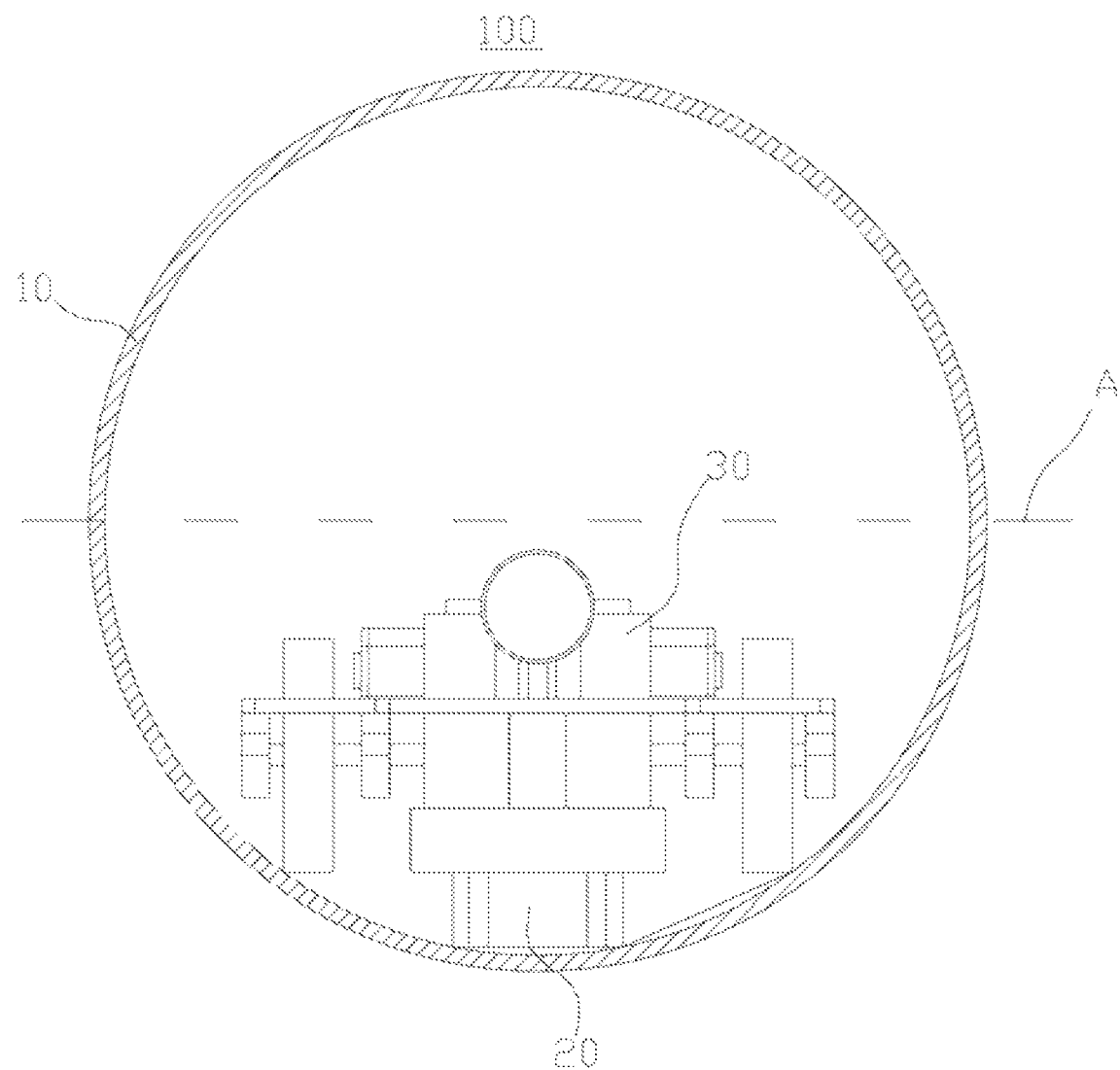
FIG. 3 illustrates a section view on the self-reconfigurable robot module provided in an embodiment of the present application.
Figure 4:
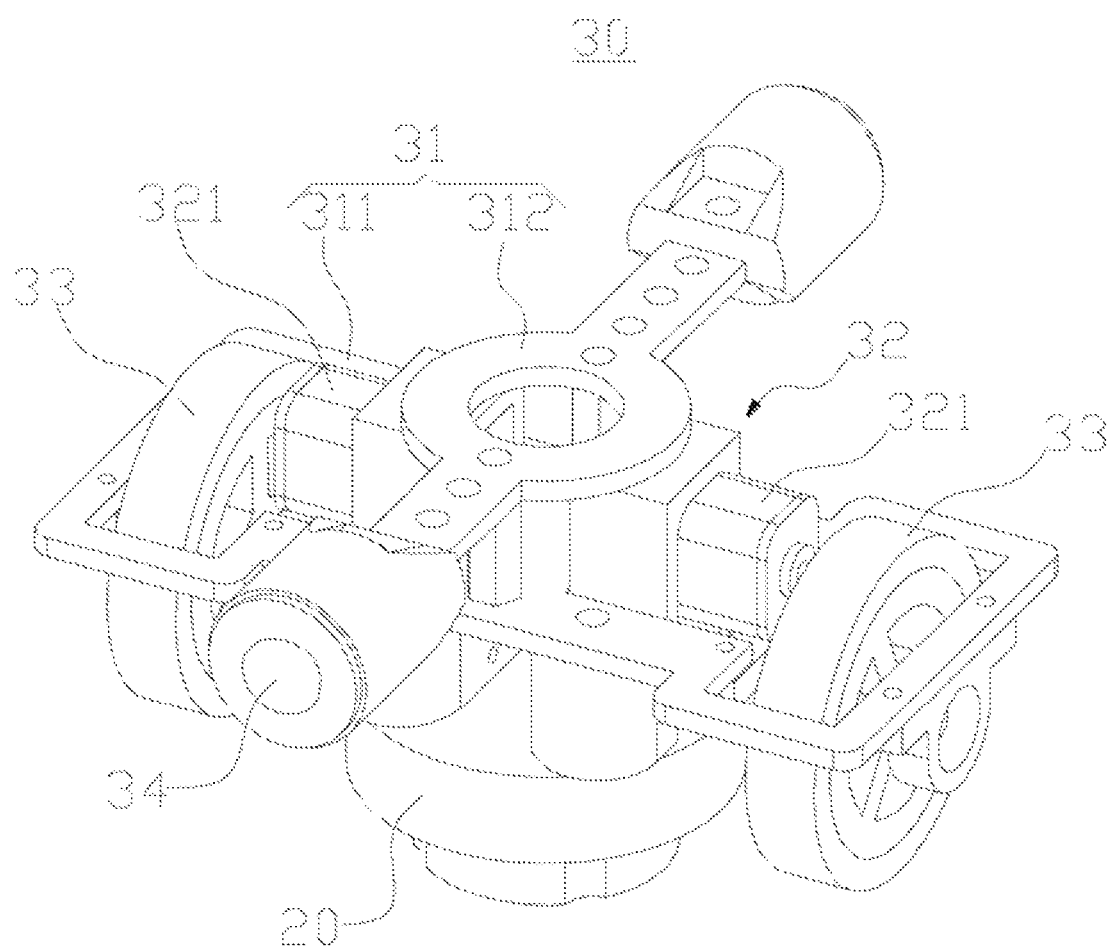
FIG. 4 illustrates a schematic diagram on a connection between of a driving mechanism and a magnet as shown in FIG. 1.
Figure 5:
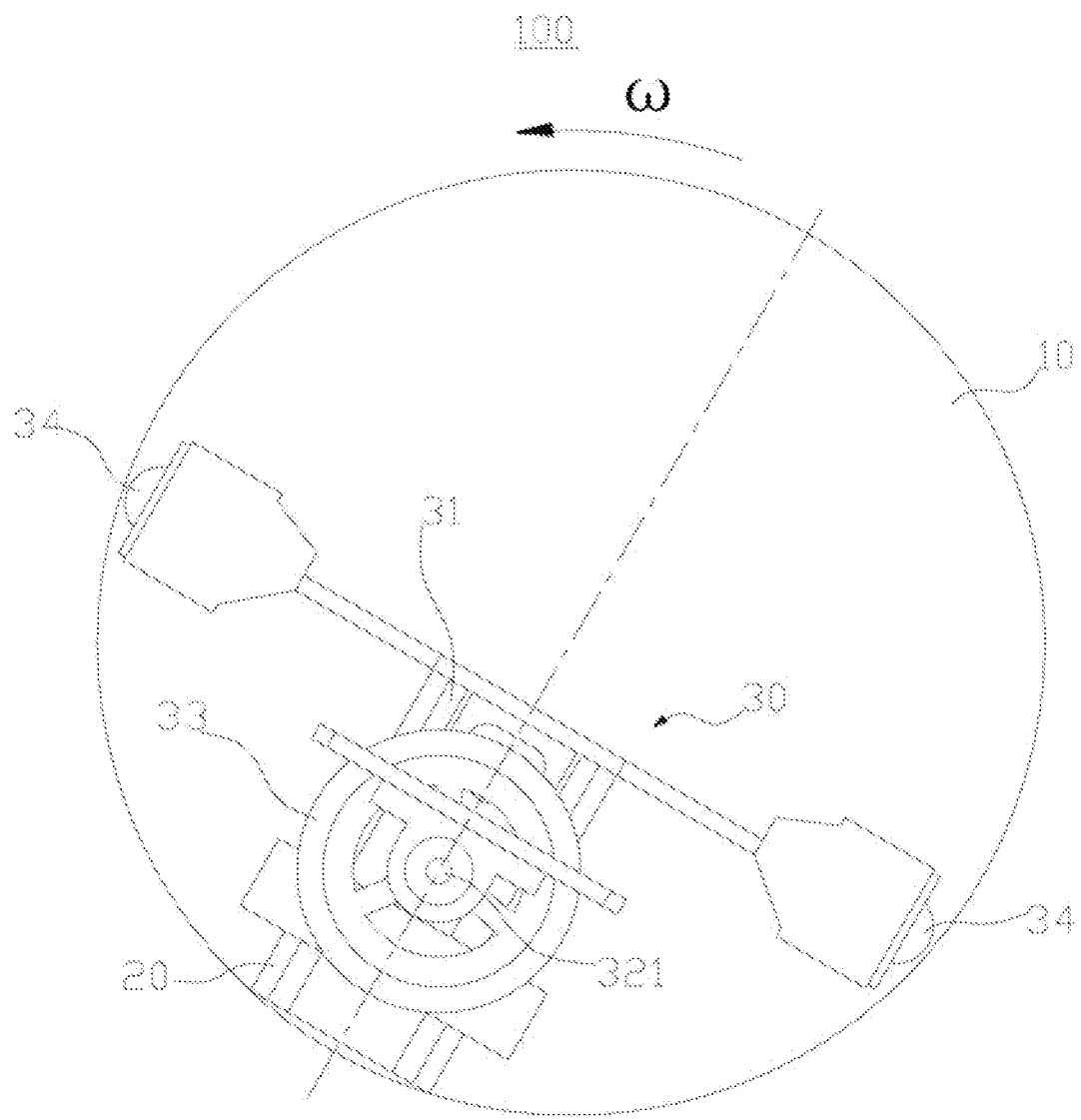
FIG. 5 illustrates a first work state diagram of the self-reconfigurable robot module provided in an embodiment of the present application.
Figure 6:
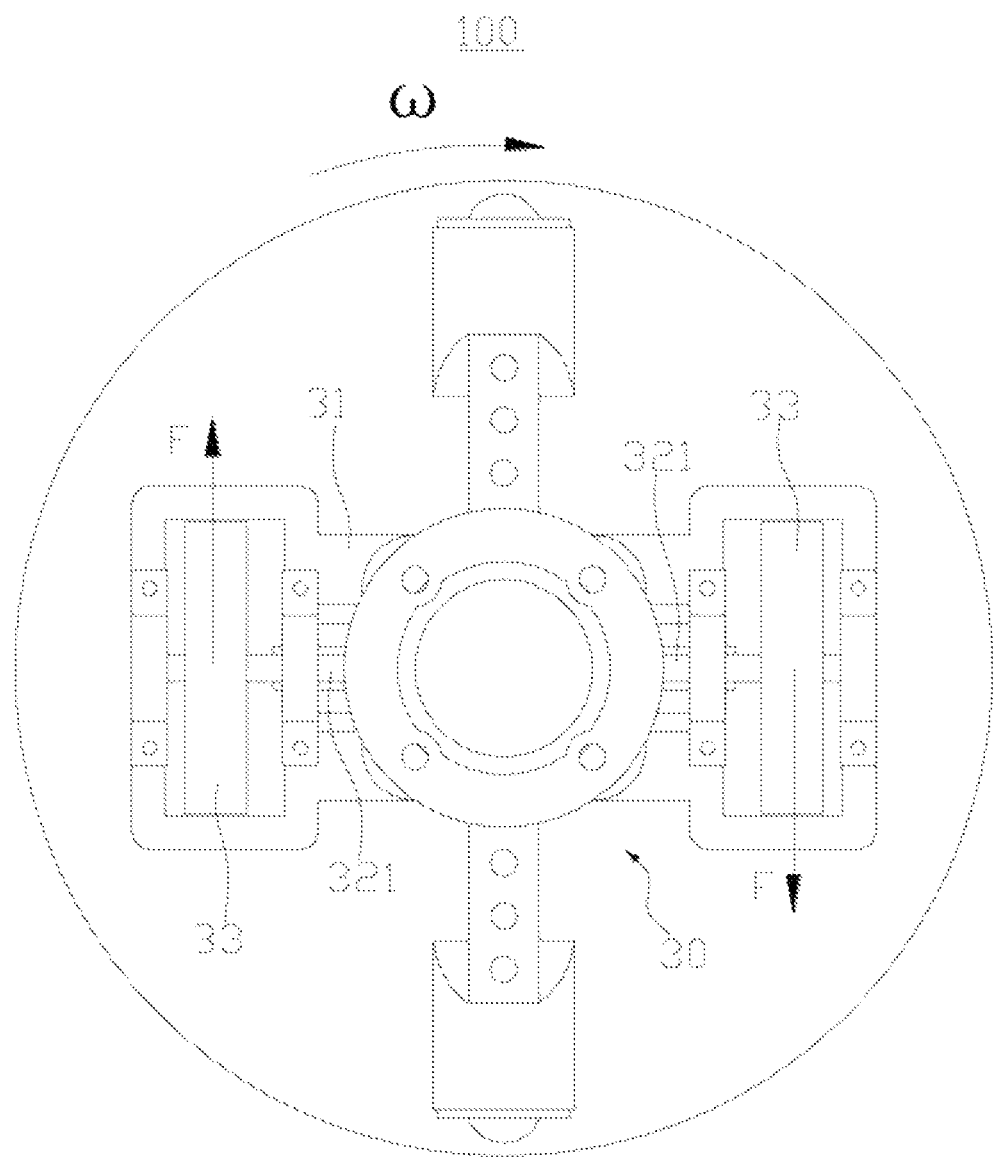
FIG. 6 illustrates a second work state diagram of the self-reconfigurable robot module provided in an embodiment of the present application.
Figure 7:
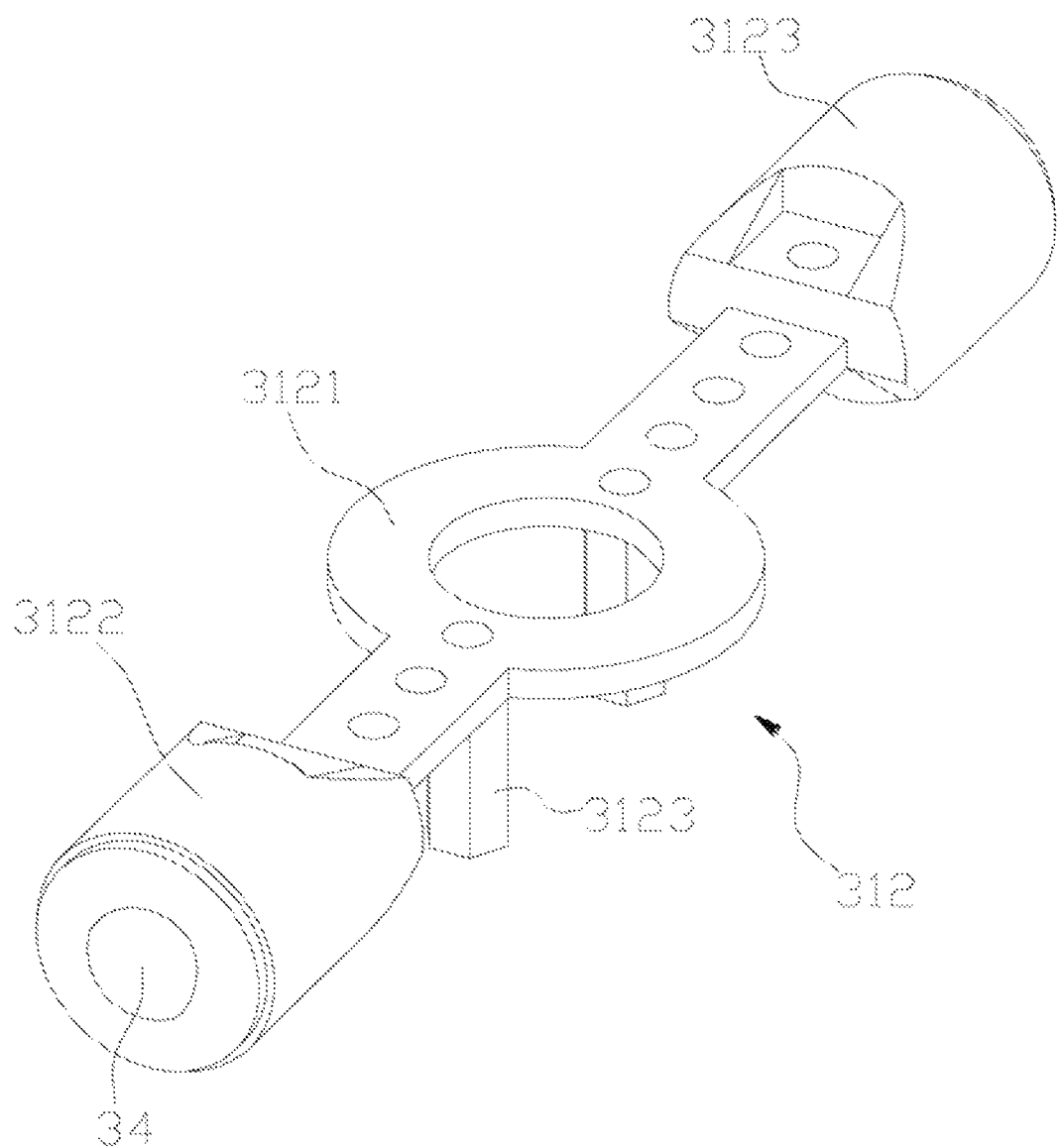
FIG. 7 illustrates a schematic diagram on a connection between a guiding wheel and a second frame body as shown in FIG. 4.
Figure 8:
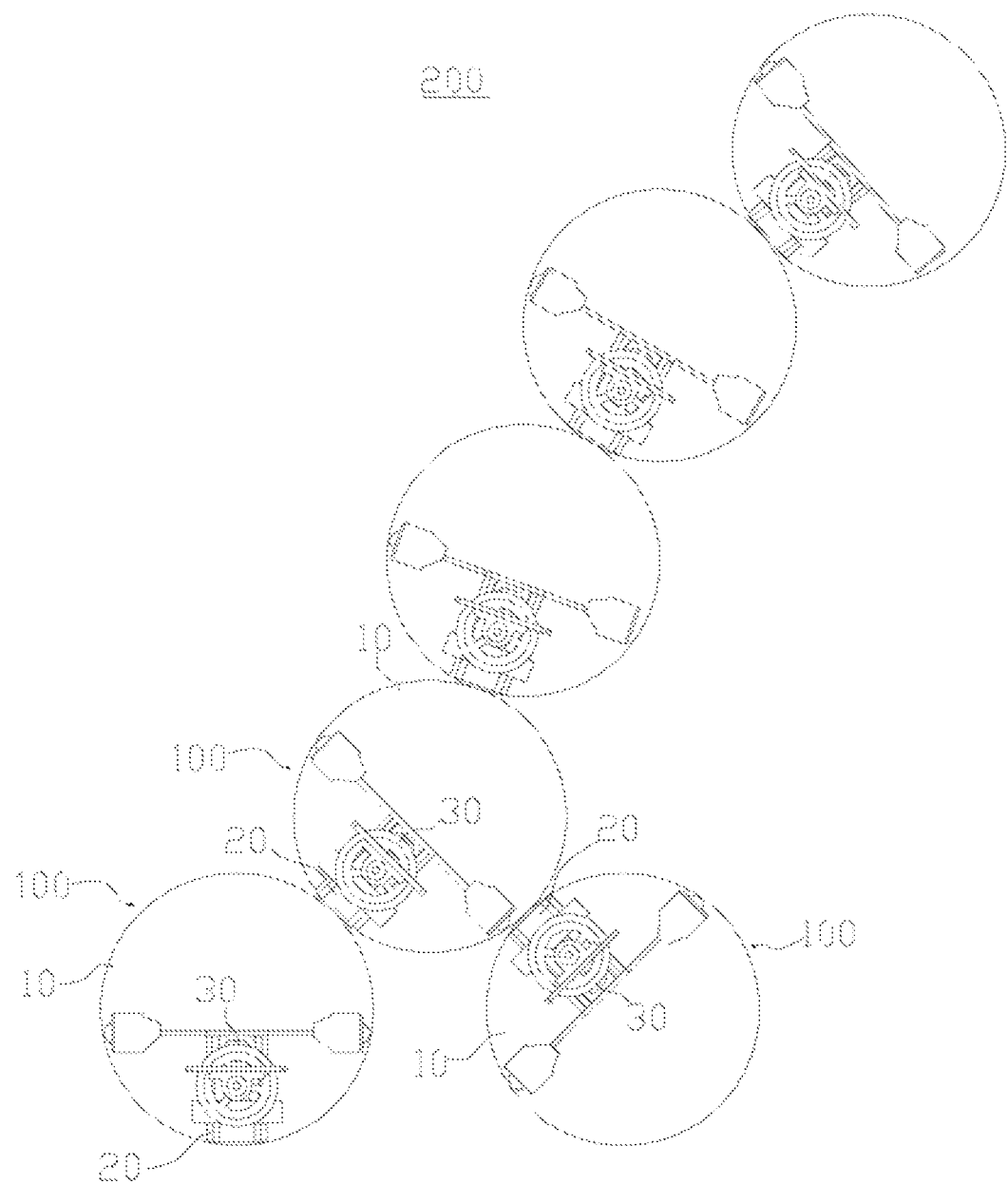
FIG. 8 illustrates a structural schematic diagram of a self-reconfigurable robot provided in an embodiment of the present application.

FIG. 1 illustrates a structural schematic diagram of a self-reconfigurable robot module 100 provided in an embodiment of the present application; FIG. 2 illustrates a schematic diagram on a connection between two self-reconfigurable robot modules 100 provided in an embodiment of the present application; FIG. 3 illustrates a section view on the self-reconfigurable robot module 100 provided in an embodiment of the present application; FIG. 4 illustrates a schematic diagram on a connection between of a driving mechanism 30 and a magnet 20 as shown in FIG. 1; FIG. 5 illustrates a first work state diagram of the self-reconfigurable robot module 100 provided in an embodiment of the present application; FIG. 6 illustrates a second work state diagram of the self-reconfigurable robot module 100 provided in an embodiment of the present application; FIG. 7 illustrates a schematic diagram on a connection between a guiding wheel 34 and a second frame body 312 as shown in FIG. 4; FIG. 8 illustrates a structural schematic diagram of a self-reconfigurable robot 200 provided in an embodiment of the present application.

As shown in FIG. 1, the self-reconfigurable robot module 100 comprises a rolling shell 10, a magnet 20 and a driving mechanism 30. The magnet 20 locates in and magnetically connects with the rolling shell 10; the driving mechanism 30 locates in the rolling shell 10, the magnet 20 connects to the driving mechanism 30, the driving mechanism 30 abuts against an inner wall of the rolling shell 10 through an attraction force between the magnet 20 and the rolling shell 10, while the driving mechanism 30 is applied to driving the magnet 20 to move along the inner wall of the rolling shell 10 and changing a gravity center of the self-reconfigurable robot module 100.

Both the magnet 20 and the driving mechanism 30 are locating inside the rolling shell 10, making a structure of the self-reconfigurable robot module 100 as a whole compact, a volume small and a weight light. The magnet 20 and the rolling shell 10 are magnetically connected, that is, between the magnet 20 and the rolling shell 10, there is an attraction force generated, to make the driving mechanism 30 abut against the inner wall of the rolling shell 10. The magnet 20 generates a magnet field around itself, and the magnet 20 is able to be applied to generating an attraction force with the rolling shells 10 of a plurality of other self-reconfigurable robot modules 100; of course, the rolling shell 10 thereof is also able to generate an attraction with the magnet 20 of the other self-reconfigurable robot modules 100. When the driving mechanism 30 drives the magnet 20 to move along the inner wall of the rolling shell 10, a position of the magnet 20 relative to the rolling shell 10 changes, thereby changing a position of a connection point on the rolling shell 10 for connecting with the other self-reconfigurable robot modules 100, which makes a plurality of positions on a surface of the rolling shell 10 be able to act as a plurality of connection points, and a connection between the self-reconfigurable robot modules 100 requires no connection between a plurality of specific connectors, having a short connection time and a high efficiency. In addition, since during a process of the driving mechanism 30 driving the magnet 20 to move, a position of the center of gravity of the self-reconfigurable robot module 100 changes, generating a torque and making the self-reconfigurable robot module 100 roll forward, making the self-reconfigurable robot module 100 be able to roll along a plane, and even climb up a vertical wall being able to be absorbed and attached by the magnet 20, further realize an automatic connection between the self-reconfigurable robot modules 100.

It should be noted that, between the magnet 20 and the inner wall of the rolling shell 10, it may be a contact connection, or a non-contact connection. If it is a contact connection between the magnet 20 and the inner wall of the rolling shell 10, that is the magnet 20 is absorbed and attached tightly onto the inner wall of the rolling shell 10; if it is a non-contact connection between the magnet 20 and the inner wall of the rolling shell 10, that is, there is a distance exist between the magnet 20 and the inner wall of the rolling shell 10.

The present embodiment, wherein the magnet 20 and the inner wall of the rolling shell 10 are forming a non-contact connection. Although there is an attraction force between the magnet 20 and the rolling shell 10, the magnet 20 and the inner wall of the rolling shell 10 are not contacting each other, that makes the magnet 20 be able to move more easily under an action of the driving mechanism 30. In an embodiment, a closest distance between the magnet 20 and the inner wall of the rolling shell 10 is between 0.2 mm-3 mm.

Shown as FIG. 2, when two self-reconfigurable robot modules 100 are connecting, the magnet 20 of one self-reconfigurable robot module 100 generates an attraction with the rolling shell 10 of another self-reconfigurable robot module 100, which makes the rolling shell 10 of one self-reconfigurable robot module 100 connect with the rolling shell 10 of another self-reconfigurable robot module 100 at a position near the magnet 20.

To facilitate a description, the two self-reconfigurable robot modules 100 in FIG. 2 are defined as a first self-reconfigurable robot module 101 and a second self-reconfigurable robot module 102 respectively. Suppose the first self-reconfigurable robot module 101 does not move, and the second self-reconfigurable robot module 102 can roll. When the driving mechanism 30 of the second self-reconfigurable robot module 102 drives the magnet 20 to move along the inner wall of the rolling shell 10, the second self-reconfigurable robot module 102 may crawl on a surface of the rolling shell 10 of the first self-reconfigurable robot module 101, before forming a spherical joint structure.

The present embodiment, wherein the rolling shell 10 is a metal hollow sphere, this kind of structure brings the rolling shell 10 a better rolling ability.

The rolling shell 10 may be made of a plurality of materials, as long as being able to generate a magnetic force with the magnet 20. A material of the rolling shell 10 may be Iron, Cobalt or Nickel.

Of course, the rolling shell 10 may be divided into two half shells, and the two half shells are connected together to form a complete sphere. Such a structure facilitates an installation of the magnet 20 and the driving mechanism 30 into the rolling shell 10.

A plurality of other embodiments, wherein the rolling shell 10 may also have a plurality of other shapes, as long as the rolling shell 10 may make a roll when the center of gravity of the self-reconfigurable robot module 100 changes. In an embodiment, the rolling shell 10 is a hollow polyhedron, and in this case, the more surfaces the rolling shell 10 has, the better the rolling performance is.

The present embodiment, as shown in FIG. 3, wherein the driving mechanism 30 and the magnet 20 are both located in a lower hemisphere of the metal hollow sphere. This structure makes the center of gravity of the self-reconfigurable robot module 100 in a whole deviate lower, in a process of the driving mechanism 30 driving the magnet 20 to move, the self-reconfigurable robot module 100 is easier to roll.

It is noted that, the rolling shell 10 is divided into an upper part and a lower part by a reference surface A passing through a center of the rolling shell 10, the upper part is an upper hemisphere, the lower part is the lower hemisphere. The driving mechanism 30 and the magnet 20 are both located in the lower hemisphere, that is, the driving mechanism 30 and the magnet 20 are both below the reference plane A.

The present embodiment, wherein the magnet 20 is a permanent magnet. In an embodiment, the magnet 20 is cylindrical. In a plurality of other embodiments, the magnet 20 may also be an electromagnet.

An action of the driving mechanism 30 is driving the magnet 20 move along the inner wall of the rolling shell 10, and the driving mechanism 30 may be a plurality of structures.

Optionally, shown as FIG. 4, the driving mechanism 30 comprises a base frame 31, a driving device 32 and at least one driving wheel 33. The driving wheel 33 is rotatably arranged on the base frame 31, the driving device 32 is applied to driving the driving wheel 33 to rotate relative to the base frame 31. The magnet 20 connects to the base frame 31, and the driving wheel 33 abuts against the inner wall of the rolling shell 10 by the attraction force between the magnet 20 and the rolling shell 10.

The present embodiment, wherein the driving wheel 33 is arranged as two, two driving wheels 33 are arranged on the base frame 31 oppositely.

In an embodiment, the driving wheel 33 is a robber wheel, such a structure is able to increase an friction between the driving wheel 33 and the rolling shell 10.

Of course, the driving device 32 may also be a plurality of structures. In the present embodiment, the driving device 32 comprises two driving units 321, each driving unit 321 is applied to driving a driving wheel 33 rotate relative to the base frame 31 accordingly.

Driving the two driving wheels 33 independently by the two driving units 321, it is able to control a rotation of the two driving wheels 33 separately, to realize the rotation of the two driving wheels 33 in a same direction or an opposite direction. Shown as FIG. 5, when the two driving units 321 are driving the two driving wheels 33 to rotate in the same direction respectively, the magnet 20 may be made move on a circle relative to the rolling shell 10, further making the rolling shell 10 roll (in the FIG. 5, the rolling shell 10 rotates in a counter clock wise direction); shown as FIG. 6, when the two driving units 321 are driving the two driving wheels to rotate in the opposite directions respectively, the frictions subjected by the two driving wheels 33 are in the opposite direction, the driving unit 321 in a whole may drive the magnet 20 rotate (in the FIG. 6, the driving unit 321 drives the magnet 20 rotate in a clockwise direction), and change a direction of the driving mechanism 30 in a whole, making the magnet 20 able to move on different cycles relative to the rolling shell 10. Under an action of the two driving units 321, it is possible to make the magnet 20 locate at any one position on the rolling shell 10, making the any one position on the surface of the rolling shell 10 be able to act as a connection point.

It is noted that, when the two driving wheels 33 rotate in a same direction under the action of the two driving units 321, two rotational speeds of the two driving wheels 33 are equal, and two linear speeds of two contact points between the two driving wheels 33 and the inner wall of the rolling shell 10 are equal; when the two driving wheels 33 rotate in the opposite direction under the action of the two driving units 321, the two driving wheels 33 have an equal rotation speed, and the contact points of the two driving wheels 33 and the inner wall of the rolling shell 10 have an equal linear speed.

In an embodiment, the driving unit 321 comprises a drive motor and a reducer, both the drive motor and the reducer are amounted on the base frame 31, an output shaft of the drive motor connects with an input shaft of the reducer, and the driving wheel 33 is amounted on the output shaft of the reducer. When the drive motor is powered on, the drive motor may drive the driving wheel 33 to rotate.

In another embodiment, the two driving wheels 33 may also be driven by one driving unit 321 at a same time. In this case, the two driving wheels 33 may only rotate in the same direction, so the driving mechanism 30 may only drive the magnet 20 roll on a circle along the inner wall of the rolling shell 10.

In another embodiment, the driving wheels 33 may also be set as one, three, and more. In a case of the driving wheel 33 is set as three, it is possible to drive three of the driving wheels 33 to rotate by one driving unit 321, or drive three of the driving wheels 33 to rotate individually by three driving units 321. Of course, three of the driving wheels 33 may be arranged collinearly or not.

Further, continue referring to FIG. 4, the magnet 20 is fixed to a bottom of the base frame, and the magnet 20 locates in a middle position of the driving wheel 33. Such a structure makes the driving mechanism 30 in a whole have a good stability. In addition, when the two driving units 321 drive the two driving wheels 33 to rotate in the opposite direction respectively, the magnet 20 may rotate with a centerline thereof as an axis, which ensures that the magnet 20 has a good stability during the rotation.

The magnet 20 and the base frame 31 may be connected in various ways, including bonding two of them together, or connecting the two of them together by a plurality of screws.

Further, the driving mechanism 30 comprises at least one guiding wheel 34 rotatably arranged on the base frame 31, applied to contacting the inner wall of the rolling shell 10. The guiding wheel 34 acts as an auxiliary support, to ensure that the driving mechanism 30 may maintain a balance during a process of driving the magnet 20 to move.

The guiding wheel 34 may be set as one, two, three, or more. In an embodiment, there are two guiding wheels 34.

The present embodiment, wherein the two guiding wheels 34 are arranged on the base frame 31 at an interval along a front-and-rear direction, the two driving wheels 33 are arranged on the base frame 31 at an interval along a left-and-right direction, a contact position between the guiding wheels 34 and the inner wall of the rolling shell is higher than a contact position between the driving wheels 33 and the inner wall of the rolling shell 10.

A structure described above, wherein the two driving wheels 33 are arranged in an interval along the left-and-right direction, the two guiding wheels 34 are arranged in an interval along the left-and-right direction, that is, a connection line between the two driving wheels 33 is perpendicular to a connection line between the two guiding wheels 34.

When the driving mechanism 30 drives the magnet 20 to move forward along the inner wall of the rolling shell 10, the guiding wheel 34 located on a front side may play a good supporting role; when the driving mechanism 30 drives the magnet 20 to move backwards along the inner wall of the rolling shell 10, the guiding wheel 34 on a rear side may play a good supporting role, that makes the driving mechanism 30 have a good stability during driving the magnet 20 moving. In addition, when the two driving wheels 33 are in a close contact with the rolling shell 10 due to a magnetic force between the magnet 20 and the rolling shell 10, it will not lead a friction between the two guiding wheels 34 and the rolling shell 10 to increase, due to a huge attraction force generated by the magnet 20, thus preventing the friction between the guiding wheel 34 and the rolling shell 10 from being excessive and affecting the driving mechanism 30 driving the magnet 20 to move.

In a plurality of other embodiments, the two guiding wheels 34 may also be arranged in a plurality of other directions. In an embodiment, the two guiding wheels 34 are arranged on the base frame 31 at an interval along an up and down direction.

Optionally, continue referencing to FIG. 4, the base frame 31 comprises a first frame body 311 and a second frame body 312, the driving wheel 33 is rotatably arranged on the first frame body 311, the guiding wheel 34 is rotatably arranged on the second frame body 312, the first frame body 311 and the second frame body 312 are detachably connected. Such a structure may facilitate assembling and disassembling the guiding wheel 34.

Wherein the first frame body 311 is a plate-shaped structure, the magnet 20 is mounted on a lower surface of the first frame body 311, the drive motor and the reducer in the driving unit 321 are both mounted on an upper surface of the first frame body 311.

The second frame body 312 is a long bar unit. The second frame body 312 is detachably mounted above the first frame body 311 by a plurality of screws, and the two guiding wheels 34 are arranged at two ends of the second frame body 312 respectively.

The present embodiment, wherein shown as FIG. 7, the two guiding wheels 34 are both a spherical body. The second frame body 312 comprises a connection plate 3121 and two hollow cylinders 3122 connecting to both ends of the connection plate 3121, the two guiding wheels 34 are arranged in the two hollow cylinders 3122 respectively. The hollow cylinder 3122 has a compression spring arranged inside (not shown in FIG. 7). Under an action of the compression spring, a part of the guiding wheel 34 extends out of the hollow cylinder 3122, to contact the rolling shell 10. In addition, a bottom of the connection plate 3121 has two supporting columns 3123 arranged. When the second frame body 312 connects to the first frame body 311, the two supporting columns 3123 on the bottom of the connection plate 3121 abut the upper surface of the first frame body 311. Penetrating a plurality of screws into the supporting columns 3123, and screwing the screws into the first frame body 311, it is able to realize a connection between the second frame body 312 and the first frame body 311.

In addition, shown as FIG. 8, an embodiment of the present application further provides a self-reconfigurable robot 200, comprising a plurality of self-reconfigurable robot modules 100 provided in the embodiments described above, and every two adjacent self-reconfigurable robot modules 100 are connected magnetically.

The self-reconfigurable robot modules 100 in the self-reconfigurable robot 200 are able to realize a multi-point high-efficiency connection in between, and by multiple self-reconfigurable robot modules 100, it is possible to build a plurality of self-reconfigurable robots 200 of various forms, to adapt to a plurality of various different working environments.

It should be noted that, a number of the self-reconfigurable robot modules 100 in the self-reconfigurable robot 200 may be two, three, four, and more.

Each self-reconfigurable robot module 100 may compose to a plurality of self-reconfigurable robots 200 of various forms, and a specific form of the self-reconfigurable robot 200 may be changed according to a specific application scenario. As an embodiment, in FIG. 8, each of the self-reconfigurable robot modules 100 stack together on each other before forming a self-reconfigurable robot 200 similar to a mechanical arm. This kind of the self-reconfigurable robot 200 may be applied in various scenarios, for example, a plurality of robot modules can form a snake robot, a quadruped robot or a robotic arm, etc.

In FIG. 8, when various of the reconfiguration robot modules 100 are combined, after the reconfiguration robot modules 100 at a bottom are connected to each other, a plurality of other reconfiguration robot modules 100 may stack sequentially into a manipulator structure by rolling and climbing.

It should be understood that, the application of the present application is not limited to the above examples listed. It will be possible for a person skilled in the art to make modification or replacements according to the above descriptions, which shall all fall within the scope of protection in the appended claims of the present application.

What is claimed is:

1. A self-reconfigurable robot module, comprising:
a rolling shell;
a magnet, the magnet locates in and magnetically connects with the rolling shell; and
a driving mechanism, the driving mechanism locates in the rolling shell, the magnet connects to the driving mechanism, the driving mechanism abuts against an inner wall of the rolling shell through an attraction force between the magnet and the rolling shell, while the driving mechanism is applied to driving the magnet to move along the inner wall of the rolling shell and changing a gravity center of the self-reconfigurable robot module, the driving mechanism further including:
a base frame;
at least one driving wheel rotatably arranged on the base frame and including two driving wheels arranged oppositely, the magnet connecting to the base frame, and the driving wheel abutting against the inner wall of the rolling shell by the attraction force between the magnet and the rolling shell;
a driving device including two driving units, and each driving unit being applied to driving a driving wheel accordingly to rotate relative to the base frame; and
at least one guiding wheel rotatably arranged on the base frame and applied to contacting with the inner wall of the rolling shell.

2. The self-reconfigurable robot module according to claim 1, wherein the magnet and the inner wall of the rolling shell form a non-contact connection.

3. The self-reconfigurable robot module according to claim 1, wherein the at least one guiding wheel comprise two guiding wheels;
the two driving wheels are arranged on the base frame at an interval along a left-and-right direction;
the two guiding wheels are arranged on the base frame at an interval along a front-and-rear direction;
a contact position of the guiding wheel and the inner wall of the rolling shell is higher than a contact position of the driving wheel and the inner wall of the rolling shell.

4. The self-reconfigurable robot module according to claim 3, wherein the base frame comprises a first frame body and a second frame body;
the driving wheel is rotatably arranged on the first frame body;
the guiding wheel is rotatably arranged on the second frame body;
the first frame body and the second frame body are detachably connected.

5. The self-reconfigurable robot module according to claim 1, wherein the rolling shell is a metal hollow sphere.

6. The self-reconfigurable robot module according to claim 5, wherein the driving mechanism and the magnet are both located in a lower hemisphere of the metal hollow sphere.

7. A self-reconfigurable robot, comprising a plurality of self-reconfigurable robot modules;
every two adjacent self-reconfigurable robot modules are magnetically connected; wherein,
the self-reconfigurable robot module comprises:
a rolling shell;
a magnet, the magnet locates in and magnetically connects with the rolling shell; and
a driving mechanism, the driving mechanism locates in the rolling shell, the magnet connects to the driving mechanism, the driving mechanism abuts against an inner wall of the rolling shell through an attraction force between the magnet and the rolling shell, while the driving mechanism is applied to driving the magnet to move along the inner wall of the rolling shell and changing a gravity center of the self-reconfigurable robot module, the driving mechanism further including:
a base frame;
at least one driving wheel rotatably arranged on the base frame and including two driving wheels arranged oppositely, the magnet connecting to the base frame, and the driving wheel abutting against the inner wall of the rolling shell by the attraction force between the magnet and the rolling shell;
a driving device including two driving units, and each driving unit being applied to driving a driving wheel accordingly to rotate relative to the base frame; and
at least one guiding wheel rotatably arranged on the base frame and applied to contacting with the inner wall of the rolling shell.

8. The self-reconfigurable robot according to claim 7, wherein the magnet and the inner wall of the rolling shell form a non-contact connection.

9. The self-reconfigurable robot according to claim 7, wherein the at least one guiding wheel comprise two guiding wheels;
the two driving wheels are arranged on the base frame at an interval along a left-and-right direction;
the two guiding wheels are arranged on the base frame at an interval along a front-and-rear direction;
a contact position of the guiding wheel and the inner wall of the rolling shell is higher than a contact position of the driving wheel and the inner wall of the rolling shell.

10. The self-reconfigurable robot according to claim 9, wherein the base frame comprises a first frame body and a second frame body;
the driving wheel is rotatably arranged on the first frame body;

the guiding wheel is rotatably arranged on the second frame body;
the first frame body and the second frame body are detachably connected.

11. The self-reconfigurable robot according to claim 7, wherein the rolling shell is a metal hollow sphere.

12. The self-reconfigurable robot according to claim 11, wherein the driving mechanism and the magnet are both located in a lower hemisphere of the metal hollow sphere.

* * * * *